United States Patent
Weissman et al.

(10) Patent No.: US 8,652,248 B2
(45) Date of Patent: *Feb. 18, 2014

(54) CEMENT MIXES CONTAINING ADDITIVES FOR ALTERING THE HARDENING RATE OF CHEMICALLY BONDED SILICO-PHOSPHATE CEMENTS AND METHODS THEREFOR

(71) Applicant: IMI TAMI Institute for Research and Development Ltd., Haifa Bay (IL)

(72) Inventors: Aharon Weissman, M.P. Misgav (IL); Yelena Gorelik, Kiryat Byalik (IL); Eyal Yehihel Vultz, Kfar Saba (IL); Dorit Perle, Haifa (IL); Basam Masri, Haifa (IL); Gideon Shikolsky, Kiryat Motzkin (IL); Ezrah Hanuka, Haifa (IL); Ron Frim, Haifa (IL); Eyal Ginzberg, Zikhron-Yaakov (IL)

(73) Assignee: Imi Tami Institute For Research and Development Ltd, Haifa Bay (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,200

(22) Filed: Feb. 4, 2013

(65) Prior Publication Data
US 2013/0199415 A1 Aug. 8, 2013

Related U.S. Application Data

(63) Continuation-in-part of application No. 12/866,476, filed as application No. PCT/IL2009/000139 on Feb. 5, 2009, now Pat. No. 8,366,821, which is a continuation-in-part of application No. PCT/IL2011/000912, filed on Nov. 30, 2011.

(60) Provisional application No. 61/026,490, filed on Feb. 6, 2009, provisional application No. 61/485,130, filed on May 12, 2011.

(51) Int. Cl.
C04B 12/02 (2006.01)

(52) U.S. Cl.
USPC ............................ 106/690; 106/691; 106/692

(58) Field of Classification Search
USPC .......................................... 106/690, 691, 801
See application file for complete search history.

(56) References Cited

U.S. PATENT DOCUMENTS 2,988,521 A    6/1961  Innes et al.
3,960,580 A    6/1976  Stierli et al.
(Continued)

FOREIGN PATENT DOCUMENTS

EP    2169027 A1    3/2010
GB    405508 A      2/1934
GB    593172 A      10/1947

OTHER PUBLICATIONS

Hall et al., The effect of retarders on the microstructure and mechanical properties of magnesia-phosphate cement mortar, Cement and Concrete Research, 2001, pp. 455-465, vol. 31.

(Continued)

Primary Examiner — Paul Marcantoni
(74) Attorney, Agent, or Firm — The Law Office of Michael E. Kondoudis

(57) ABSTRACT

A cement mix for preparation of a magnesium silico-phosphate cement (MSPC) with an altered hardening rate is provided. The cement mix comprises on the order of 1% of an $[MF_6]^{n-}$ salt or acid. Upon addition of water, the mix produces a final set cement that has similar physical properties to those of a cement prepared from a mix lacking the additive, but with a significantly altered setting time. In some embodiments of the invention, the additive is provided in the form of a coating for the MgO component of the mix. In preferred embodiments, $H_2TiF_6$, $Na_2TiF_6$ and/or $K_2TiF_6$ are used as retarders, while $K_3AlF_6$ is used as an accelerant. Other embodiments use $M'_nMF_6$ compounds wherein M' is an alkali metal, an alkaline earth metal, or H, and M is chosen from inter alia Ti (n=2), Zr (n=2), P (n=1), Al (n=3), and Sb (n=1).

47 Claims, 8 Drawing Sheets

(56) References Cited

U.S. PATENT DOCUMENTS

| | | | |
|---|---|---|---|
| 4,626,558 | A | 12/1986 | Pellico |
| 4,758,278 | A | 7/1988 | Tomic |
| 4,786,328 | A | 11/1988 | Weill et al. |
| 5,039,509 | A | 8/1991 | Miyata et al. |
| 6,458,423 | B1 | 10/2002 | Goodson |
| 6,783,799 | B1 | 8/2004 | Goodson |
| 7,160,383 | B2 | 1/2007 | Wagh et al. |
| 8,366,821 | B2 * | 2/2013 | Weissman et al. ............ 106/690 |
| 2005/0215671 | A1 | 9/2005 | Gonnon et al. |
| 2007/0215354 | A1 | 9/2007 | Rickman et al. |
| 2010/0183877 | A1 | 7/2010 | Ishibashi et al. |
| 2010/0313792 | A1 | 12/2010 | Weissman et al. |

OTHER PUBLICATIONS

International Search Report dated Jul. 2, 2009 in corresponding International Application No. PCT/IL2009/000139.

International Search Report dated May 15, 2012 in co-pending International Application No. PCT/IL2011/000912.

* cited by examiner

CEMENT MIXES CONTAINING ADDITIVES FOR ALTERING THE HARDENING RATE OF CHEMICALLY BONDED SILICO-PHOSPHATE CEMENTS AND METHODS THEREFOR

REFERENCE TO RELATED APPLICATIONS

This application a Continuation-in-Part of U.S. patent application Ser. No. 12/866,476, now issued as U.S. Pat. No. 8,366,821, which was filed on 5 Feb. 2009 under the provisions of 35 U.S.C. 371(c) as the U.S. national phase filing of PCT application PCT/IL2009/000139, and claims priority from U.S. Provisional Application No. 61/026,490, filed 6 Feb. 2008. This application further claims priority under the provisions of 35 U.S.C. 120 and 35 U.S.C. 365(c) from PCT application PCT/IL2011/00912, filed 30 Nov. 2011, which claims priority from U.S. Provisional Application No. 61/485,130, filed 12 May 2011. The contents of each of these applications are hereby incorporated by reference in their entirety.

FIELD OF THE INVENTION

This invention relates to additives (also known as admixtures) for altering the rate of hardening of cements, particularly those additives that can decelerate or accelerate the rate of hardening of magnesium silico-phosphate cements (MSPC).

BACKGROUND OF THE INVENTION

Because of their rapid hardening, high strength, and good binding to existing concrete, magnesium silico-phosphate cements, (MSPC) and in particular ammonium magnesium silico-phosphate (monoammonium phosphate, or MAP) cements (which comprise inter alia MgO and a soluble phosphate salt) are widely used as patching mortar for roads and airport runways. While rapid hardening can be a positive characteristic in situations such as road or runway repair where minimization of downtime is a goal, too rapid hardening can be a drawback as it limits the amount of time during which the cement can be worked before it sets. In order to control the hardening time, additives have been developed, primarily to lengthen the time before the cement sets. The most frequently used retarders for these cements are based on borate salts or boric acid, which can extend the time during which the cement is workable from about 10 minutes to about half an hour (see, e.g. U.S. Pat. No. 3,960,580 and U.S. Pat. No. 7,160,383). It should be mentioned here that the amount of retarder that can be added is limited to about 1-2% w/w, which extends the workability by only 10 minutes. Larger amounts of retarder can further extend the workability, but at the expense of significant deterioration in the compressive strength (CS) of the cement after it has set.

Other retarder systems have been proposed to overcome these difficulties. For example, U.S. Pat. No. 4,786,328 discloses the use of polycarboxylic acids (e.g. citric acid) or polyphosphonic acids (e.g. nitrilotris(methylene)tris(phosphonic acid). These compounds do not significantly extend the time before the cement sets, however. U.S. Pat. No. 6,783, 799 discloses the use of fluorosilicates as retarders. In this case, however, the primary means by which the set time is extended is to delay for as long as possible the mixing of the acid and base fractions of the cement mix, presumably to reduce the rate of formation of the complex hydrated salt $MMgPO_4 \cdot 6H_2O$, where M is an alkali metal or $NH_4^+$. Due to the high exothermicity of the chemical reaction between the cement and added water (e.g. $\Delta H_{rxn} \sim -88$ kcal/mol for formation of $KMgPO_4 \cdot 6H_2O$), the addition of water leads to a rise in temperature, causing the process to undergo auto-acceleration. Simple fluoride salts have also been proposed as retarders for phosphate cements. For example, U.S. Pat. No. 6,458, 423 teaches the use of a number of compounds including NaF and $CaF_2$ for use as retarders for phosphate cements. There is no evidence, however, that these retarders are any more effective than the borate salts currently considered most effective. Tomic, in U.S. Pat. No. 4,758,278, discloses the use of magnesium ferrate, prepared by heating magnesium oxide particles in the presence of ferric oxide, as a retarder. While this method did succeed in approximately doubling the set time of the resulting cement, it requires an additional preparative step, and even with the use of magnesium ferrate, set times were typically no longer than those obtained by the use of borate retarders.

There thus remains a long-felt need for a straightforward method by which the rate of hardening of these cements can be controlled more precisely than by the crude methods known in the prior art.

An additional difficulty is that the retarder or accelerator is generally added as a separate component. Care must thus be taken to add the retardant or accelerant at the proper time, at the proper rate, and in the proper amount. A phosphate cement that contains an accelerator or retardant as part of one of the components of the cement mix rather than as a separate additive, while having improved physical properties, thus remains a long-felt yet unmet need.

SUMMARY OF THE INVENTION

The invention herein disclosed is designed to meet these two long-felt needs. In particular, the present invention discloses a family of dry cement mixes containing additives that (a) are readily available; (b) can significantly alter the rate of hardening of MSPCs in contexts in which a different hardening rate would be desirable; and (c) do not adversely affect the properties, particularly the compressive strength, of the hardened cement. The present invention discloses the use of a new family of retarders and accelerants based on commercially available salts and acids of complex fluoride anions of the general formula $[MF_6]^{n-}$.

In some embodiments of the invention, the magnesia particles within the cement mix are at least partially coated with a retarder. The presence of the retarder as a coating on the magnesia particles has the effects of making the cement mix easier to use and store; of improving the qualities of the mix; improving the alteration of the setting time; and improving the physical properties (e.g. workability) of the cast.

It is therefore an object of this invention to disclose a dry cement mix for preparation of a magnesium silico-phosphate cement, said dry cement mix comprising MgO; a phosphate salt or acid selected from the group consisting of (a) a phosphate salt or acid of the general formula $M_xH_yPO_4$ ($1 \leq x \leq 3$, $y=3-x$), where M is selected from the group consisting of H, Li, Na, K, Rb, Cs, $NH_4$, and any combination of the above, (b) any other phosphate salt or acid that will provide a binder product characterized by the empirical chemical formula $MMgPO_4 \cdot 6H_2O$, and (c) any combination of the above; an aggregate phase selected from the group containing $CaSiO_3$, $SiO_2$, fly ash, sea sand, and any combination thereof; and a fluorine-containing additive. It is within the essence of the invention wherein said fluorine-containing additive is selected from the group consisting of (a) alkali metal salts of $[M'F_6]^{n-}$, (b) alkaline earth metal salts of $[M'F_6]^{n-}$, and (c)

$H_nM'F_6$, wherein n represents a positive integer and M' is selected from the group consisting of (a) Ti (n=2), (b) P (n=1), (c) Zr (n=2), (d) Sb (n=1), and (e) Al (n=3).

In some preferred embodiments of the invention, said aggregate phase additionally comprises talc.

It is a further object of this invention to disclose a dry cement mix as defined in any of the above, wherein said MgO is provided in the form of particles, and said particles of MgO are at least partially coated with said fluorine-containing additive. In some embodiments, the particle size of said particles of MgO is between 0.1 μm and 100 μm. In some embodiments, the additive is coated upon said particles of MgO in a thickness of at least 0.5 monolayer. In some embodiments, the additive is coated upon said particles of MgO in a thickness of at least one monolayer. In some preferred embodiments, the MgO particles coated with additive are the products of a process of spray drying. In some embodiments, the MgO particles coated with additive are the products of a process comprising steps of preparing a slurry by adding a predetermined amount of said additive to a predetermined volume of water; adding said particles of said MgO to said slurry; feeding said addition product to a spray dryer; and spray-drying said addition product, thereby producing coated particles of MgO.

It is a further object of this invention to disclose the dry cement mix as defined in any of the above, wherein M' is selected from the group consisting of (a) Ti (n=2), (b) P (n=1), (c) Zr (n=2), and (d) Sb (n=1), and further wherein said additive acts as a retarder. In some preferred embodiments of the invention, the retarder is present in an amount of between about 0.05% and about 5% by weight.

It is a further object of this invention to disclose the dry cement mix as defined in any of the above, wherein M' is selected from the group consisting of (a) Al (n=3) and (b) P (n=1), and further wherein said additive acts as an accelerant. In some preferred embodiments of the invention, the accelerant is present in an amount of between about 0.05% and about 5% by weight.

It is a further object of this invention to disclose a method for producing a dry cement mix comprising MgO particles coated with a fluorine-containing additive, wherein said method comprises: preparing a slurry comprising a predetermined amount of a fluorine-containing additive in a predetermined volume of water; adding a predetermined quantity of MgO to said slurry; feeding the product of said step of adding into a dryer; drying said product, thereby producing particles of MgO at least partially coated with said additive; and, mixing said at least partially coated particles of MgO with said phosphate salt or acid and aggregate.

In some embodiments of the invention, said step of drying is chosen from the group consisting of spray drying, freeze drying, and drum drying. In some embodiments, said step of feeding the product of said step of adding into a dryer comprises a step of feeding the product into a spray dryer, and said step of drying comprises a step of spray drying. In some preferred embodiments of the invention, the method additionally comprises a step of operating said spray dryer under conditions adapted to produce droplets of sizes between 0.1 μm and 200 μm. In other preferred embodiments of the invention, the method additionally comprises a step of operating said spray dryer under conditions adapted to produce particles of sizes between 0.1 μm and 100 μm. In some embodiments of the invention, said step of spray drying additionally comprises maintaining the temperature of the air exiting the spray dryer above 100° C. In some embodiments of the invention, said step of spray drying additionally comprises a step of maintaining the temperature of the air exiting the spray dryer at about 105° C. In some preferred embodiments of the invention, the fluorine-containing additive is selected from the group consisting of $H_2TiF_6$, $Na_2TiF_6$, $K_2TiF_6$, and any combination of the above. In some preferred embodiments of the invention, the weight ratio between MgO and additive is between 0.2% and 25%.

It is a further object of this invention to disclose a magnesium silico-phosphate cement (MSPC) comprising: a dry cement mix as defined in any of the above in which the aggregate phase comprises talc and sufficient water to effect hydraulic hardening of said cement. In some preferred embodiments of the invention, the crystal structure of said binder product is isomorphic with $NH_4MgPO_4 \cdot 6H_2O$.

It is a further object of this invention to disclose an MSPC comprising a dry cement mix as defined in any of the above in which the particles of MgO are at least partially coated by said fluorine-containing additive and sufficient water to effect hydraulic hardening of said cement. In some preferred embodiments of the invention, the crystal structure of said binder product is isomorphic with $NH_4MgPO_4 \cdot 6H_2O$.

It is a further object of this invention to disclose an MPSC having a Vicat penetration force as defined by ASTM standard C 403/C 403M-06 of at least 100 lbf, said MSPC comprising (a) a dry cement mix comprising MgO; a phosphate salt or acid selected from the group consisting of (a) a phosphate salt or acid of the general formula $M_xH_yPO_4$ (1≤x≤3, y=3−x) where M is selected from the group consisting of H, Li, Na, K, Rb, Cs, $NH_4$, and any combination of the above; (b) any other phosphate salt or acid that will provide a binder product characterized by the empirical chemical formula $MMgPO_4 \cdot 6H_2O$; and (c) any combination of the above; an aggregate phase selected from the group containing (a) $CaSiO_3$, (b) $SiO_2$, (c) fly ash, (d) sea sand, and (e) any combination thereof; and sufficient water to effect hydraulic hardening of said cement, said water containing a fluorine-containing additive, in a form selected from the group consisting of (i) suspension, (ii) solution, (iii) any combination thereof. It is within the essence of the invention wherein said fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

In some preferred embodiments of the invention, the aggregate phase additionally comprises talc. In some preferred embodiments of the invention, the crystal structure of said binder product is isomorphic with $NH_4MgPO_4 \cdot 6H_2O$. In some embodiments of the invention, M' is selected from the group consisting of (a) Ti (n=2), (b) P (n=1), (c) Zr (n=2), and (d) Sb (n=1) and acts as a retarder. In some preferred embodiments of the invention, the retarder is present in an amount of between about 0.05% and about 5% by weight based upon the weight of dry cement. In some embodiments of the invention, M' is selected from the group consisting of (a) Al (n=3) and (b) P (n=1) and acts as an accelerant. In some preferred embodiments of the invention, the accelerant is present in an amount of between about 0.05% and about 5% by weight based upon the weight of dry cement.

It is a further object of this invention to disclose a method for altering the rate of hardening of a magnesium silicophosphate cement (MSPC), comprising: (1) obtaining a magnesium silico-phosphate cement mix comprising MgO; a phosphate salt or acid selected from the group consisting of (a) a phosphate salt or acid of the general formula $M_xH_yPO_4$ (1≤x≤3, y=3−x) where M is selected from the group consisting of H, Li, Na, K, Rb, Cs, $NH_4$, and any combination of the above; (b) any other phosphate salt or acid that will provide a binder product characterized by the empirical chemical formula $MMgPO_4.6H_2O$; and (c) any combination of the above; and an aggregate phase selected from the group containing (a) $CaSiO_3$, (b) $SiO_2$, (c) fly ash, (d) sea sand, (e) talc, and (f) any combination thereof; (2) adding to said cement mix a fluorine-containing additive that alters the rate of hardening of an MSPC; and (3) adding sufficient water to said mixture to effect hydraulic setting of said cement. It is within the essence of the invention wherein said fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

In some embodiments of the invention, said binder product is isomorphic with $NH_4MgPO_4.6H_2O$. In some embodiments of the invention, M' is selected from the group consisting of (a) Ti (n=2), (b) Zr (n=2), (c) P (n=1), and (d) Sb (n=1), and said additive acts as a retarder. In some preferred embodiments of the invention, said retarder is selected from the group consisting of (a) $Na_2TiF_6$; (b) $K_2TiF_6$; and (c) any combination of the above. In some preferred embodiments of the invention, the retarder is present in an amount of between about 0.05% and about 5% by weight based upon the weight of dry cement. In some embodiments of the invention, M' is selected from the group consisting of (a) Al (n=3) and (b) P (n=1), and said additive acts as an accelerant. In some preferred embodiments of the invention, said accelerant is present in an amount of between about 0.05% and about 5% by weight based upon the weight of dry cement.

In some embodiments of the invention, the method additionally comprises providing said MgO in the form of particles and coating said particles of MgO at least partially with said fluorine-containing additive.

It is a further object of this invention to disclose a method for altering the rate of hardening of an MSPC having a Vicat penetration force as defined by ASTM standard C 403/C 403M-06 of at least 100 lbf, comprising: (1) obtaining a magnesium silico-phosphate cement mix comprising MgO; a phosphate salt or acid selected from the group consisting of (a) a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; (b) any other phosphate salt or acid that will provide a binder product characterized by the empirical chemical formula $MMgPO_4.6H_2O$; and (c) any combination of the above; and an aggregate phase selected from the group containing $CaSiO_3$, $SiO_2$, fly ash, sea sand, talc, and any combination thereof; (3) preparing a combination of a fluorine-containing additive and a volume of water sufficient to effect hydraulic setting of said cement, said combination in a form selected from the group consisting of (a) a suspension of said fluorine-containing additive in said water, (b) a solution of said fluorine-containing additive in said water, and (c) any combination of the above; and (4) admixing said cement mix and said combination. It is within the essence of the invention wherein said fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

In some embodiments of the invention, said binder product is isomorphic with $NH_4MgPO_4.6H_2O$. In some embodiments of the invention, M' is selected from the group consisting of (a) Ti (n=2), (b) Zr (n=2), (c) P (n=1), and (d) Sb (n=1), and further wherein said additive acts as a retarder. In some preferred embodiments of the invention, said retarder is selected from the group consisting of (a) $Na_2TiF_6$; (b) $K_2TiF_6$; and (c) any combination of the above. In some preferred embodiments of the invention, said retarder is present in an amount of between about 0.05% and about 5% by weight based upon the weight of dry cement. In some embodiments of the invention, M' is selected from the group consisting of (a) Al (n=3) and (b) P (n=1), and further wherein said additive acts as an accelerant. In some preferred embodiments of the invention, said accelerant is present in an amount of between about 0.05% and about 5% by weight based upon the weight of dry cement.

It is an object of this invention to disclose a magnesium silico-phosphate cement (MSPC) comprising (a) a dry cement mix comprising (i) MgO, (ii) a phosphate salt or acid selected from the group consisting of a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; any other phosphate salt or acid that will provide a binder product characterized by the empirical chemical formula $MMgPO_4.6H_2O$; and any combination of the above; (iii) an aggregate phase selected from the group containing $CaSiO_3$, $SiO_2$, fly ash, sea sand, and any combination thereof; and (iv) a fluorine-containing additive; and (b) sufficient water to effect hydraulic hardening of said cement. It is in the essence of the invention wherein said additive significantly alters the rate of hardening of said cement relative to the rate of hardening of and MSPC of identical composition except for the presence of said additive.

It is a further object of this invention to disclose an MSPC comprising (a) a dry cement mix comprising (i) MgO, (ii) a phosphate salt or acid selected from the group consisting of a phosphate salt or acid of the general formula $M_xH_yPO_4$ ($1 \leq x \leq 3$, $y=3-x$) where M is selected from the group consisting of H, Li, Na, K, Rb, Cs, and $NH_4$, or any combination of the above; any other phosphate salt or acid that will provide a binder product characterized by the empirical chemical formula $MMgPO_4.6H_2O$; and any combination of the above; and (iii) an aggregate phase selected from the group containing $CaSiO_3$, $SiO_2$, fly ash, sea sand, and any combination thereof; and (b) sufficient water to effect hydraulic hardening of said cement containing a fluorine-containing additive in a form selected from the group consisting of (i) suspension, (ii) solution, (iii) any combination thereof. It is in the essence of the invention wherein said additive significantly alters the rate of hardening of said cement relative to the rate of hardening of an MSPC of identical composition except for the presence of said additive.

It is a further object of this invention to disclose an MSPC as defined in any of the above wherein the crystal structure of said binder product is especially isomorphic with $NH_4MgPO_4.6H_2O$.

It is a further object of this invention to disclose an MSPC as defined in any of the above, wherein said additive is a retarder selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M represents any element that can form with fluorine an anion of empirical formula $[MF_6]^{n-}$ and n represents a positive integer.

It is a further object of this invention to disclose an MSPC as defined in any of the above, wherein M is selected from the group consisting of (a) Ti (n=2), (b) Zr (n=2), (c) Sb (n=1), and (d) any combination thereof.

It is a further object of this invention to disclose an MSPC as defined above, wherein said retarder is selected from the group consisting of (a) $Na_2TiF_6$; (b) $K_2TiF_6$; and (c) any combination of the above.

It is a further object of this invention to disclose an MSPC as defined in any of the above, wherein said retarder is present in an amount of between about 0.05% and about 5% by weight based upon the weight of dry cement.

It is a further object of this invention to disclose an MSPC as defined in any of the above, wherein said additive is an accelerant selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M is selected from the group consisting of (a) Si (n=2), (b) Al (n=3), (c) P (n=1), and (d) any combination thereof.

It is a further object of this invention to disclose an MSPC as defined above, wherein said accelerant is $K_3AlF_6$.

It is a further object of this invention to disclose an MSPC as defined in any of the above, wherein said accelerant is present in an amount of between about 0.05% and about 5% by weight based upon the weight of dry cement.

It is a further object of this invention to disclose a method for advantageously altering the rate of hardening of an MSPC, comprising the steps of (a) obtaining a magnesium silico-phosphate cement mix comprising (i) MgO, (ii) a phosphate salt or acid selected from the group consisting of a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; any other phosphate salt or acid that will provide a binder product characterized by the empirical chemical formula $MMgPO_4 \cdot 6H_2O$; and any combination of the above; and (iii) an aggregate phase selected from the group containing $CaSiO_3$, $SiO_2$, fly ash, sea sand, and any combination thereof; (b) admixing a fluorine-containing additive into said cement mix, thereby altering the rate of hardening of said MSPC; and (c) adding sufficient water to effect hydraulic setting of said cement. It is within the essence of the invention wherein said step of admixing said additive significantly alters the rate of hardening of said MSPC relative to the rate of hardening of an MSPC produced by a method lacking said step of admixing said additive.

It is a further object of this invention to disclose a method for advantageously altering the rate of hardening of an MSPC, comprising the steps of (a) obtaining a magnesium silico-phosphate cement mix comprising (i) MgO, (ii) a phosphate salt or acid selected from the group consisting of a phosphate salt or acid of the general formula $M_xH_yPO_4$ ($1 \leq x \leq 3$, $y=3-x$) where M is selected from the group consisting of H, Li, Na, K, Rb, Cs, $NH_4$ and any combination of the above; any other phosphate salt that will provide a binder product characterized by the empirical chemical formula $MMgPO_4 \cdot 6H_2O$; and any combination of the above; and (iii) an aggregate phase selected from the group containing $CaSiO_3$, $SiO_2$, fly ash, sea sand, and any combination thereof; (b) obtaining a volume of water sufficient to effect hydraulic setting of said cement, said water containing a fluorine-containing additive in the form selected from the group consisting of (i) solution, (ii) suspension, (iii) any combination thereof; and (c) admixing said cement mix and said suspension and/or solution, thereby altering the rate of hardening of said MSPC. It is within the essence of the invention wherein said step of admixing said additive significantly alters the rate of hardening of said cement relative to the rate of hardening of an MSPC produced by a method lacking said step of admixing said additive.

It is a further object of this invention to disclose a method as defined in any of the above for advantageously altering the rate of hardening of an MSPC as defined above, wherein said binder product is especially isomorphic with $NH_4MgPO_4 \cdot 6H_2O$.

It is a further object of this invention to disclose a method for advantageously altering the rate of hardening of an MSPC as defined above, wherein said fluorine-containing additive is a retarder selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M represents any element that can form with fluorine an anion of empirical formula $[MF_6]^{n-}$ where n is an integer.

It is a further object of this invention to disclose such a method, wherein M is selected from the group consisting of (a) Ti (n=2), (b) Zr (n=2), (c) Sb (n=1), and (d) any combination thereof.

It is a further object of this invention to disclose such a method, wherein said retarder is selected from the group consisting of (a) $Na_2TiF_6$; (b) $K_2TiF_6$; and (c) any combination of the above.

It is a further object of this invention to disclose a method for advantageously altering the rate of hardening of an MSPC as defined above, wherein said retarder is present in an amount of between about 0.05% and about 5% by weight based upon the weight of dry cement.

It is a further object of this invention to disclose a method for advantageously altering the rate of hardening of an MSPC as defined above, wherein said fluorine-containing additive is an accelerant selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M represents any element that can form with fluorine an anion of empirical formula $[MF_6]^{n-}$ where n is a positive integer.

It is a further object of this invention to disclose such a method, wherein M is selected from the group consisting of (a) Si (n=2), (b) Al (n=3), (c) P (n=1), and (d) any combination thereof.

It is a further object of this invention to disclose such a method, wherein said accelerant is $K_3AlF_6$.

It is a further object of this invention to disclose a method for advantageously altering the rate of hardening of an MSPC as defined above, wherein said accelerant is present in an amount of between about 0.05% and about 5% by weight based upon the weight of dry cement.

BRIEF DESCRIPTION OF DRAWINGS

FIGS. 7A-7C are graphs illustrating the effects of various additives on the compressive strength of the set cement (15 minute mixing time) as a function of time after setting.

DETAILED DESCRIPTION OF THE INVENTION

Figure 1A:
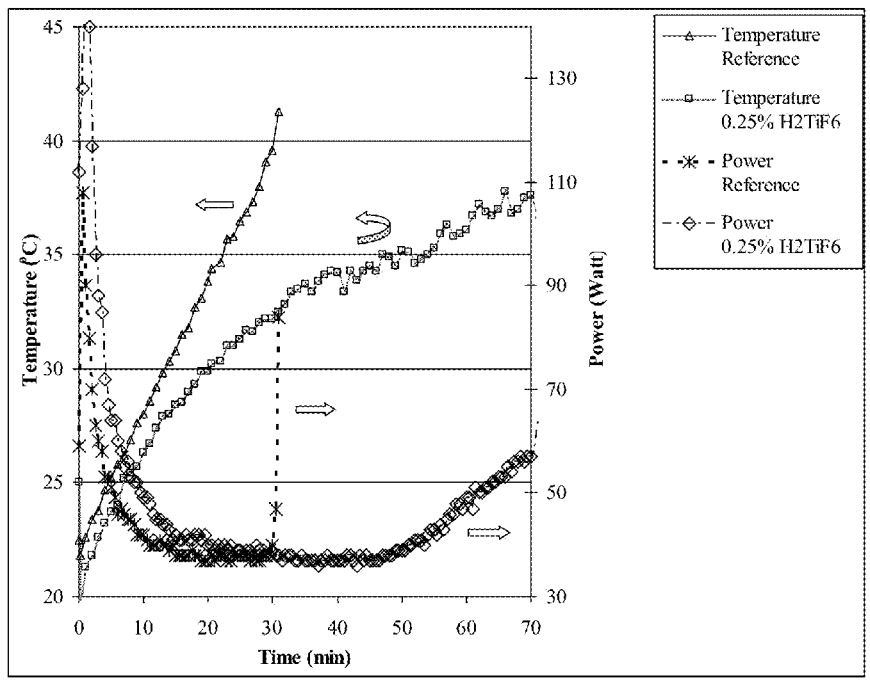
FIGS. 1A and 1B are a series of graphs illustrating the effects of added $H_2TiF_6$ on the rate of temperature increase, the mixing power, and the Vicat penetration force of Nova-Set cement as a function of $H_2TiF_6$ concentration and of time.

Other objects and the further scope of the applicability of the present invention will be apparent to one skilled in the art from the detailed description given hereinafter. It should be understood, however, that the detailed description and specific examples, while indicating preferred embodiments of the invention, are given by way of illustration only, since various changes and modifications within the spirit and scope of the invention will become apparent to one skilled in the art from this detailed description. The invention is therefore not limited by that which is illustrated in the figures and described in the specification, but only as indicated in the accompanying claims, with the proper scope determined only by the broadest interpretation of said claims.

We adopt the following definitions in the detailed description that follows:

"Retarder" refers to an additive that is added to a cement or cement mixture that has the effect of slowing down the rate at which the cement or cement mixture hardens relative the rate of hardening of a cement or cement mixture that is identical in every way except for the presence of the additive;

"Accelerant" refers to an additive that is added to a cement or cement mixture that has the effect of speeding up the rate at which the cement or cement mixture hardens relative the rate of hardening of a cement or cement mixture that is identical in every way except for the presence of the additive.

"Binder" refers to a compound formed during the interaction between the dry cement mix and water that imparts a high compressive strength to the cement.

"Setting" refers to the hardening of the cement.

"Reference cement" refers to a basic cement formulation that does not contain any additives.

"Coating" refers to any intimate contact between a substrate and a second material deposited on the surface of the substrate as well as to any process that will produce such intimate contact. Non-limiting examples of coatings according to this definition include one or more layers of the second material on the surface of the substrate, a layer of the second material on the surface of the substrate that partially covers it, absorption and/or adsorption of the second material into pores on the surface of the substrate, layers of the second material on the surfaces of some or all of a collection of particles of the substrate that have formed an aggregate or agglomerate, etc. Note that in the last case, the "coating" may actually be found only in the interior of the aggregate or agglomerate. Similarly, as used herein, a substrate described as being "coated" by another substance refers to a substrate that has undergone a process that will produce a coating thereon according to the above definition of "coating."

"Particle" refers to any individual microscopic or mesoscopic piece of a substance. The term thus includes, but is not limited to, single crystals, polycrystalline particles, and aggregates and agglomerates of smaller particles.

With reference to quantities, the term "about" refers to an amount within ±20% of the stated quantity. With reference to temperatures, the term "about" refers to a temperature within ±5° C. of the stated temperature.

The basic formulation for the cement mixture described hereinafter is a dry mixture of powdered MgO, powdered $KH_2PO_4$, and an aggregate phase chosen from $CaSiO_3$ (wollastonite), fly ash, and sea sand, in a ratio of approximately 10:35:55 by weight. This formulation will hereinafter be referred to as "Nova-Set." In some embodiments of the invention, the aggregate phase comprises talc ($Mg_3Si_4O_{10}(OH)_2$). In a most preferred embodiment of the invention, dead burned MgO is used, and a predetermined amount of a fluorine-containing additive is added to the Nova-Set mix. Water is then added in sufficient quantity (at least stoichiometric) to enable hydraulic hardening of the cement. The wet mixture is then blended for at least 15 minutes and then cast. In some of the examples detailed below, a portion of the mixture was blended until it became too viscous for further blending. In other embodiments of the invention, instead of adding the additive to the dry Nova-Set mix, an aqueous solution or suspension of the additive is prepared in sufficient water to enable hydraulic hardening of the cement. The dry Nova-Set mix is then added to this aqueous solution or suspension and the cement prepared as above.

The additives disclosed in the present invention are all compounds that contain anions of the general formula $[MF_6]^{n-}$. As discussed in detail below, when M=Ti or Zr (n=2), the additive is a retarder. For these additives, the counterion is selected from the group containing $H^+$, alkali metal cations, and alkaline earth cations. In a most preferred embodiment of the invention, M=Ti, the counterion is $H^+$, $Na^+$ or $K^+$, and the additive is present in the cement in an amount of between about 0.05% and about 5% by weight based on the weight of dry cement. A typical embodiment contains about 1% by weight of additive based on the dry weight of the final product. We note that when the counterion is $H^+$, the additive ($H_2MF_6$) reacts with the MgO present in the Nova-Set mix to form the highly soluble salt $MgMF_6$ (and $H_2O$); thus, addition of $H_2MF_6$ is essentially equivalent to adding $MgMF_6$.

On the other hand, as discussed in detail below, when M=Si (n=2), Al (n=3), or P (n=1), the additive is an accelerant. For these cases as well, the counterion is selected from the group consisting of $H^+$, alkali metal cations, and alkaline earth cations. In a most preferred embodiment of the invention, M=Al, the counterion is $K^+$, and the accelerant is present in the cement in an amount of between about 0.05% and 5% by weight based on the weight of dry cement. A typical embodiment contains about 1% by weight of additive based on dry weight of the final product.

As non-limiting examples of the properties of the additives herein disclosed, graphs comparing the properties of Nova-Set additionally containing these additives with properties of Nova-Set containing no additives are now presented. For these examples, the powder mixture was made by using a Kenwood model KM415 blender with a three-phase energy analyzer. The temperature during blending was measured by an Elcontrol Microvip 3 OPTCTLT20 temperature analyzer. An EINet—Gewiss GW44208 IP56 was used for power measurements. Vicat penetration force measurements were made according to ASTM standard C 403/C 403M-06 by using a Humboldt/Gilson model MH 570 with a sample height of 40 mm and a sample diameter of 90 mm. CS measurements were made by using an INSTRON 550R load cell 10 t. Densities of the casts were calculated from the measured weights and volumes, where the volumes were calculated from the measured radii and heights of the cylindrical casts.

Figure 1B:
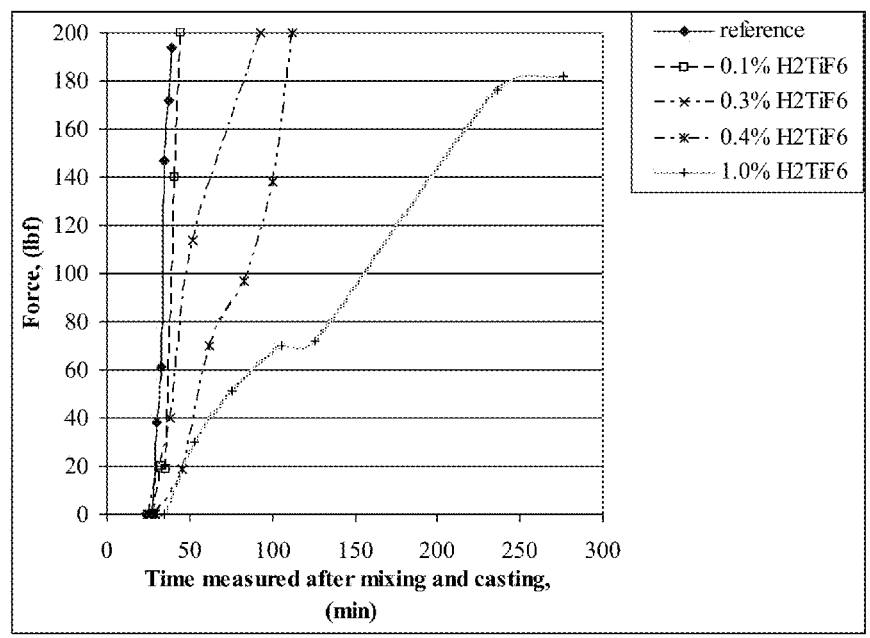

Reference is now made to FIG. 1, which shows effects of on various physical parameters of the cement when $H_2TiF_6$ is used as an additive. FIG. 1a shows the temperature of the paste and the mixing power as a function of time following the commencement of mixing. In this figure, a mix containing 0.25% $H_2TiF_6$ additive is compared with a reference sample prepared without the addition of any additive whatsoever. The temperature measurements (left-hand y-axis) demonstrate that $H_2TiF_6$ acts as a retarder, with the temperature rise during mixing delayed by over half an hour. A similar effect is seen in the mixing power (right-hand y-axis), in which a similar delay is seen in the case where the cement includes the $H_2TiF_6$ additive. FIG. 1b shows Vicat compressive force measurements made as a function of time after casting following a 15-minute mixing period for a series of experiments with different amounts of additive. The results clearly show that $H_2TiF_6$ acts as a retarder at all concentrations used, and, more importantly, that while 1% retarder reduces the final compressive strength, ~0.4% retarder actually improves the final compressive strength.

Figure 2A:
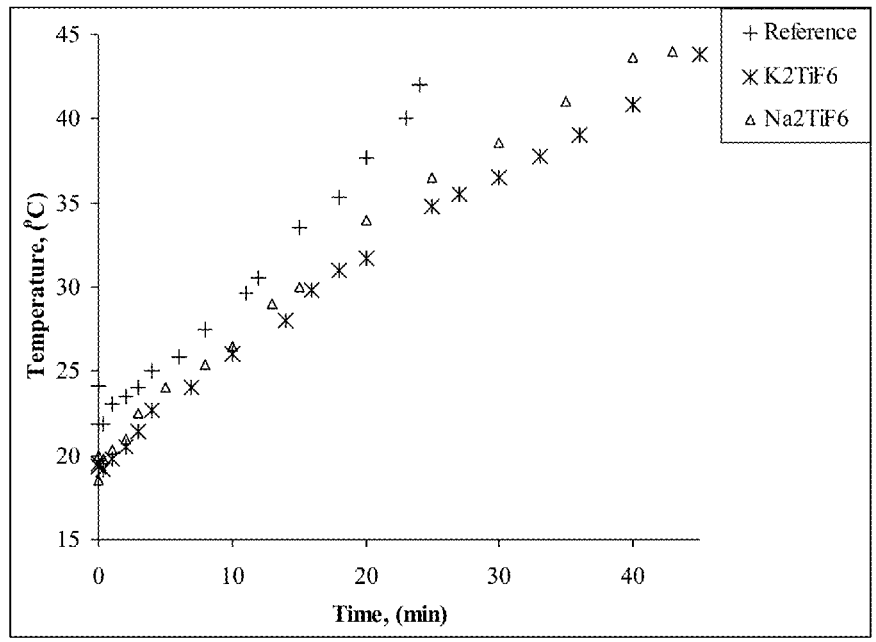
FIGS. 2A and 2B are graphs illustrating the effects of various fluorine-containing additives on the temperature of the paste as a function of time after the start of mixing.
Figure 2B:
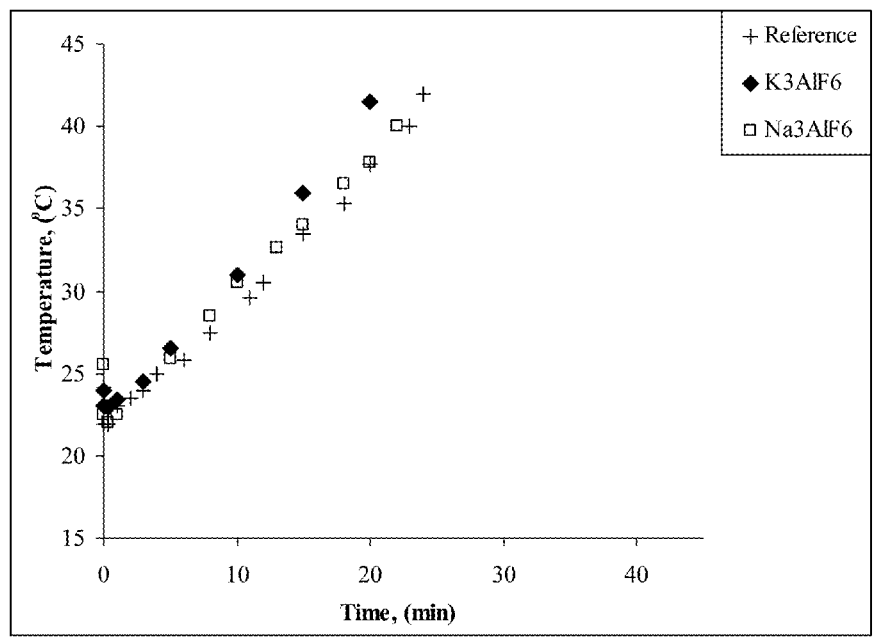

Reference is now made to FIG. 2, which shows the temperature of the cement as a function of time following the start of mixing. FIG. 2a shows results for cement containing a retarder (1% w/w $K_2TiF_6$ or $Na_2TiF_6$) relative to a reference cement not containing additive. As can clearly be seen in the figure, the rate of temperature rise due is significantly slower when the additive is present, indicating that the exothermic reaction is proceeding much more slowly in these cases (i.e. the setting rate has been significantly slowed). FIG. 2b shows results for cement containing 1% w/w $K_3AlF_6$ or $Na_3AlF_6$ relative to a reference cement not containing additive. Again, the effect of the additive can clearly be seen; in this case, however, the temperature rise is faster when the additive is present, indicating that the $[AlF_6]^{3-}$ salts accelerate the exothermic hardening of the cement, with $K_3AlF_6$ the more effective accelerator of the two. The specific accelerant/retarder effect depends both on M and on the counterion. Thus, for example, an additive containing M=Zr and $K^+$ as the counterion acts as a retarder, while an additive containing M=P and $Na^+$ as the counterion acts as an accelerant. The different degrees to which different ions affect the hardening rate can be utilized in additional embodiments in which the rate of hardening is set by the operator by the use of an appropriate mixture of salts with different properties.

Figure 3A:
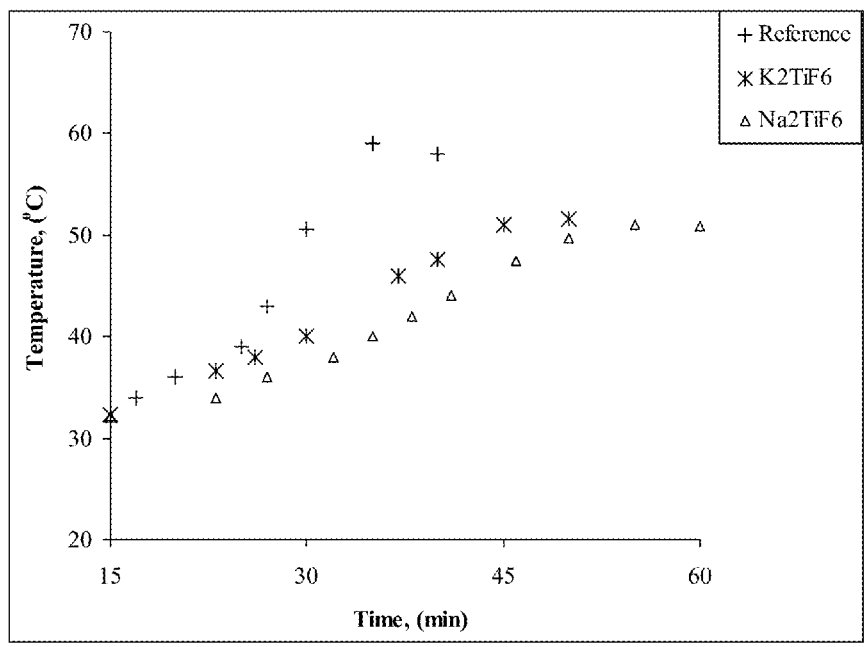
FIGS. 3A and 3B are graphs illustrating the effects of various fluorine-containing additives on the temperature of the cast cement as measured after a 15 minute paste mixing period.
Figure 3B:
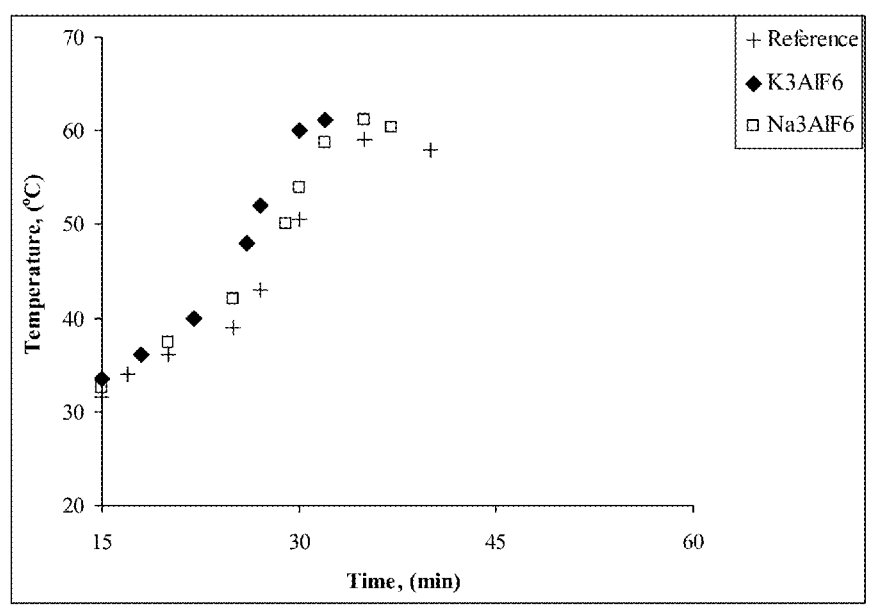

Reference is now made to FIG. 3, which shows results for measurements of the temperature of the cast made following 15 minutes of mixing (in contrast to the temperature measurements illustrated in FIG. 2, which were made during the mixing of the cement). FIG. 3a compares results for Nova-Set containing a retarder (1% w/w of either $K_2TiF_6$ or $Na_2TiF_6$) with cement containing no additive, and FIG. 3b compares results for Nova-Set to which an accelerant (1% w/w of either $K_3AlF_6$ or $Na_3AlF_6$) was added to those for cement containing no additive. As can be seen in these figures, the retarder or accelerant effect extends far beyond the mixing time; in the case of 1% $M_2TiF_6$, the retarder effect lasts for at least an hour after the start of mixing.

Figure 4A:
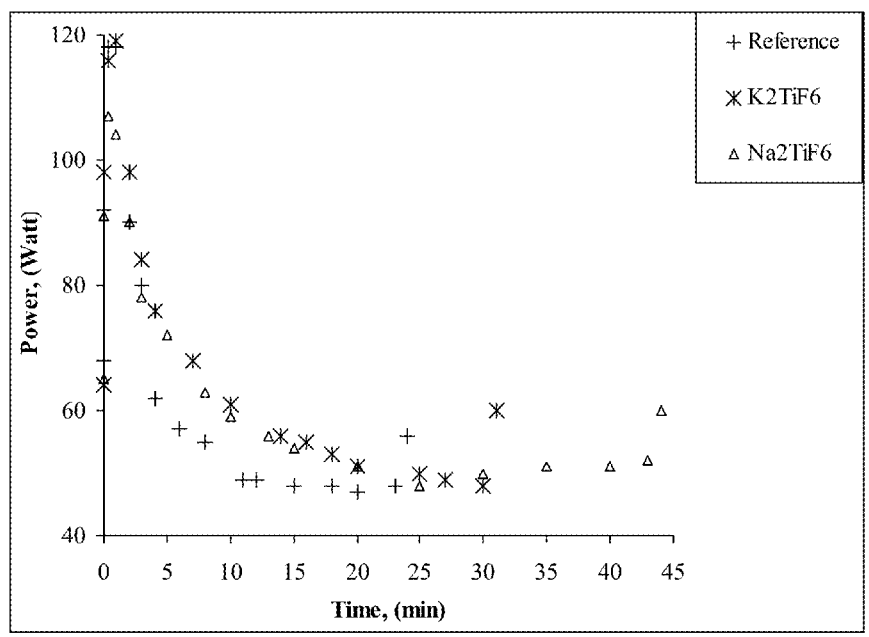
FIGS. 4A and 4B are graphs illustrating the effects of various fluorine-containing additives on the mixing power as a function of time during paste mixing.
Figure 4B:
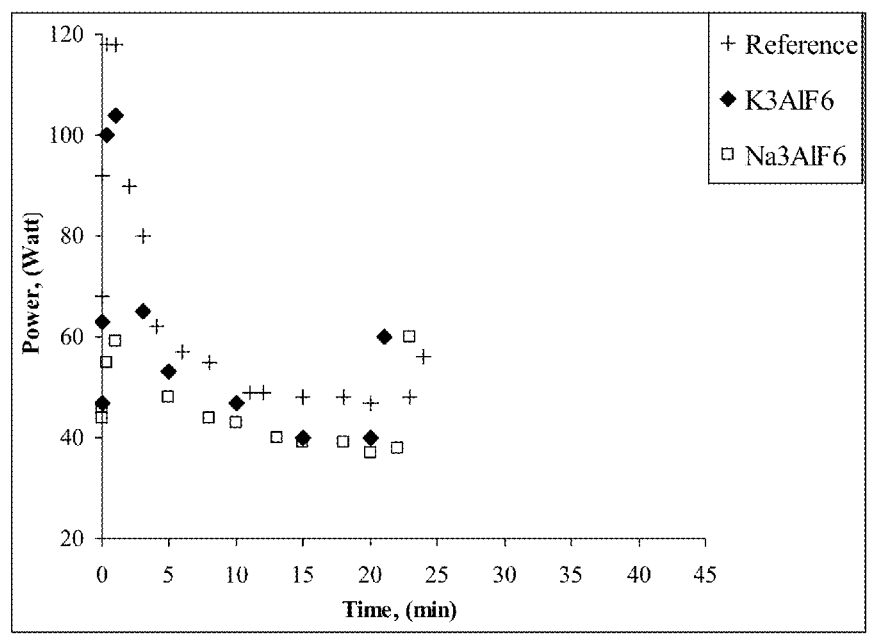

Reference is now made to FIG. 4, which shows the power used by the Kenwood mixer during mixing as a function of time for cement compositions with and without additives. FIG. 4a compares results for cement containing a retarder (1% w/w $K_2TiF_6$ or $Na_2TiF_6$) to those for cement containing no additive. The slower decline in mixing power and longer time to reach the sudden increase in mixing power for the cements containing the retarder further demonstrates the effectiveness of $[TiF_6]^{2-}$ as a retarder. Note that the final value reached is independent of whether or not the cement contains the retarder, further evidence that while the additive affects the set time, it does not significantly affect the properties of the cement after setting. FIG. 4b shows results for cement compositions containing accelerants (1% w/w $K_3AlF_6$ or $Na_3AlF_6$) relative to a reference sample without any additive. In these cases, the mixing power declines more rapidly as a function of time for compositions containing accelerant, the opposite effect seen when a retarder is added, and consistent with the previous results. Once again, it can be seen that the specific accelerant/retarder properties of the additive depend on M and on the counterion.

Figure 5:
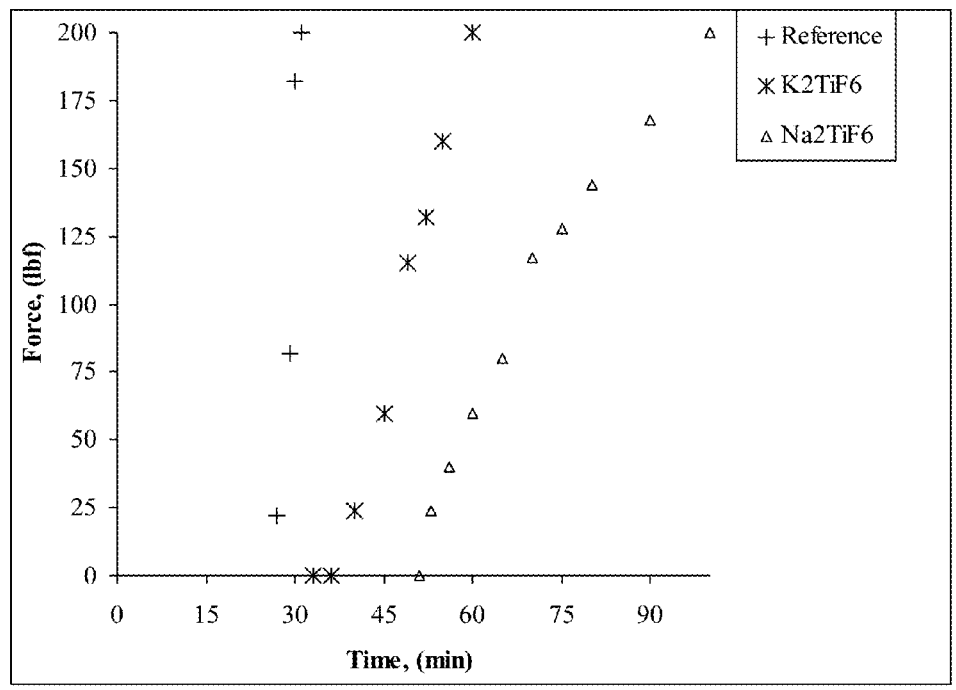
FIG. 5 shows a graph illustrating the effects of $[TiF_6]^{2-}$ additives on the Vicat force as a function of time after the maximum mixing and further casting.

Reference is now made to FIG. 5, showing results of Vicat force penetration tests for Nova-Set containing 1% w/w $M_2TiF_6$ (M=K, Na) as a function of time following the time after which the viscosity became too high for further mixing. For a cement composition not containing any additive, the force reaches 200 lbf in less than 30 min. For M=K, 200 lbf is not reached until approximately 50 min, while for M=Na, it has not been reached even after 90 min. These results clearly show that not only is the rate of reaction slower for cement containing the additive (as shown in FIGS. 2 and 3), but that the additive is slowing down the time it takes to reach a given level of hardness. Moreover, it is clear from FIG. 5 that even when the additive is present, the cement does eventually reach the same hardness that an equivalent cement lacking the additive does. Due to the extended mixing time in these experiments, by the time that most of the pastes reached the hardening stage, the Vicat penetration force was already >100 lbf, so the Vicat penetration force measurements could not be made in all cases.

Figure 6A:
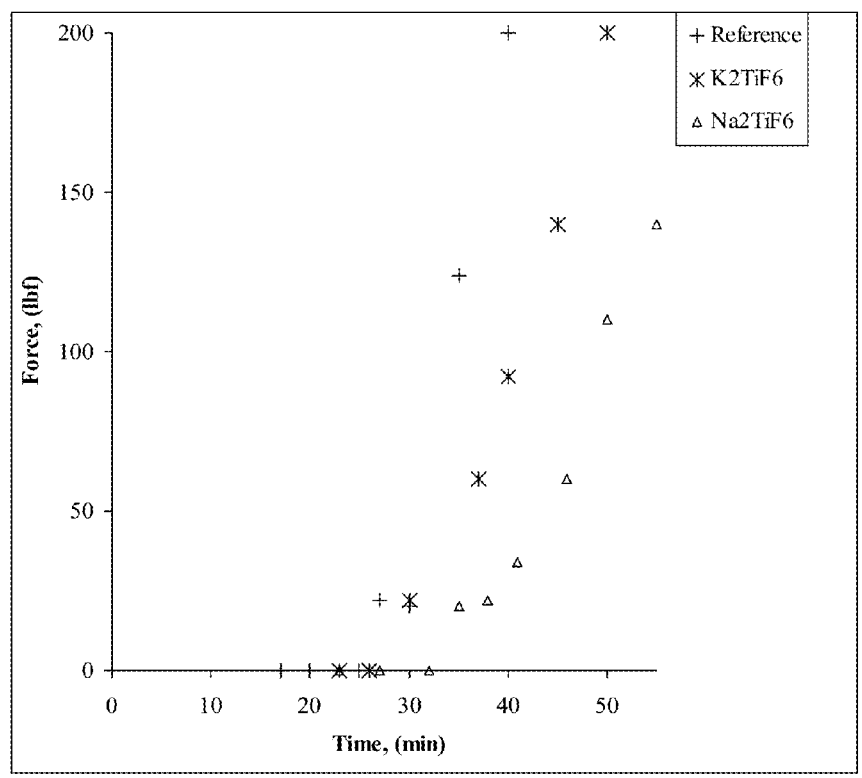
FIGS. 6A-6C are graphs illustrating the effects of various additives on the Vicat penetration force as a function of time after the completion of a 15-minute mixing period.
Figure 6B:
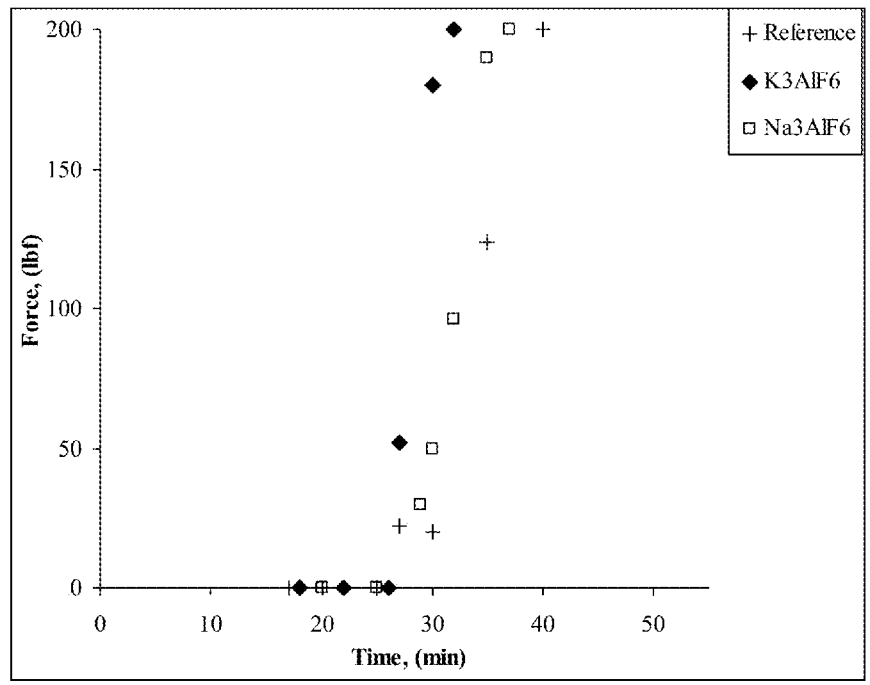
Figure 6C:
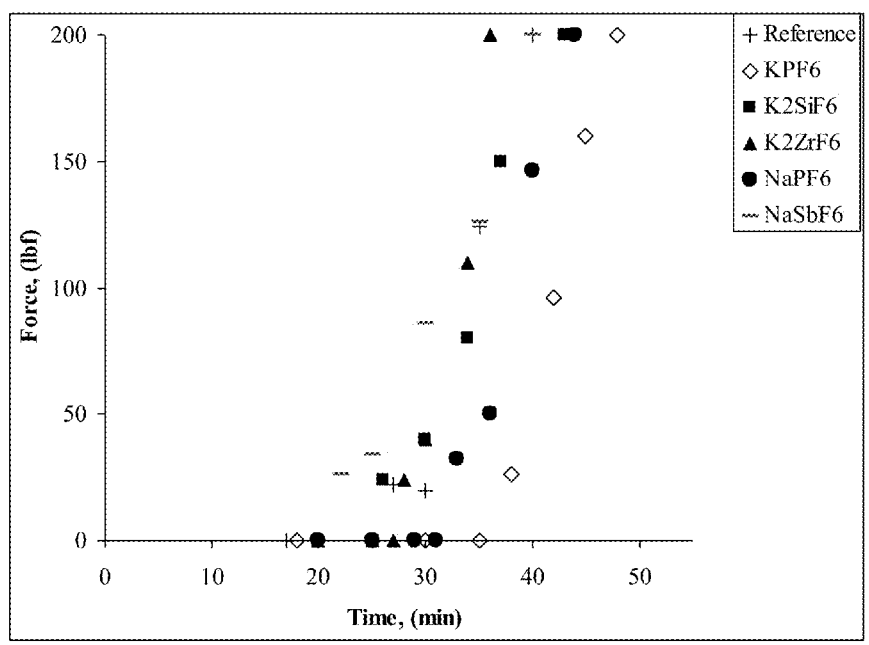

Reference is now made to FIG. 6, showing results of Vicat force penetration tests as a function of time after a 15 minute mixing period. FIG. 6a shows results for cements to which a retarder (1% $K_2TIF_6$ or $Na_2TiF_6$) has been added; FIG. 6b shows results for cements to which an accelerant (1% $K_3AlF_6$ or $Na_3AlF_6$) has been added; and FIG. 6c shows results for cements containing a variety of fluorine-containing additives. These results show the same trends in behavior as were seen for the other properties (FIGS. 1-4) and for the Vicat force penetration tests made during the mixing period.

Figure 7A:
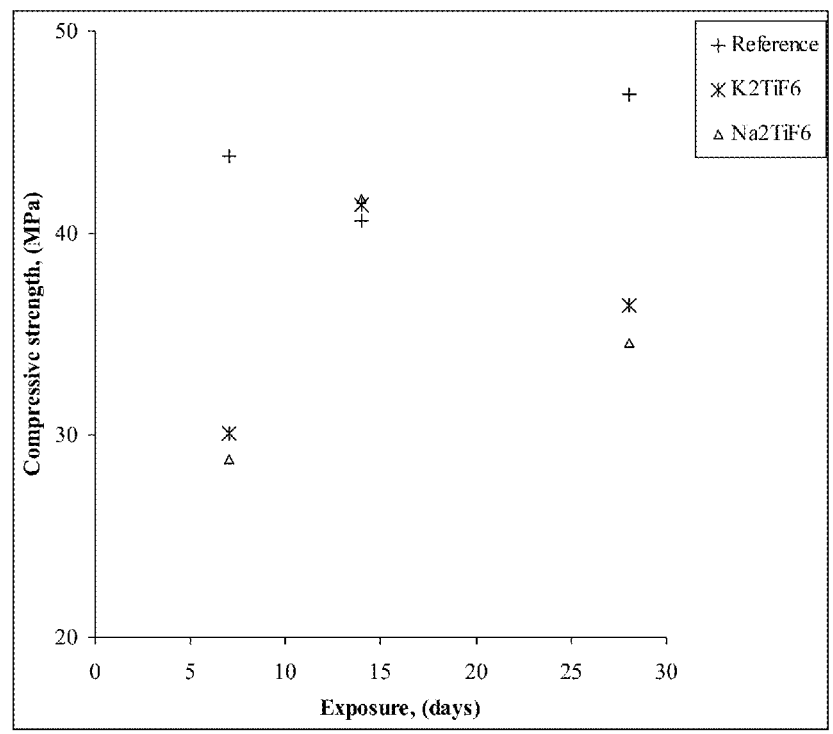
Figure 7B:
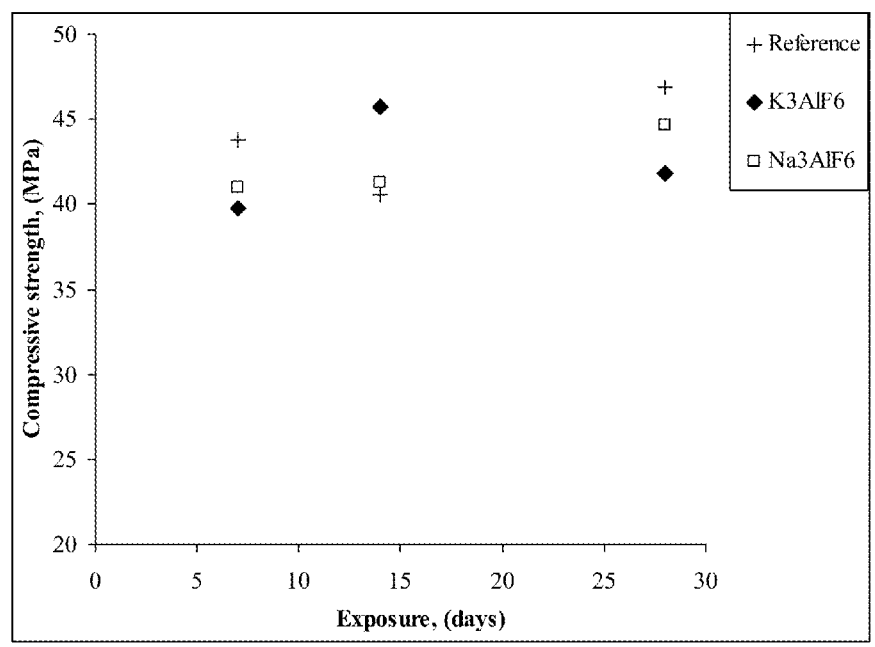
Figure 7B:
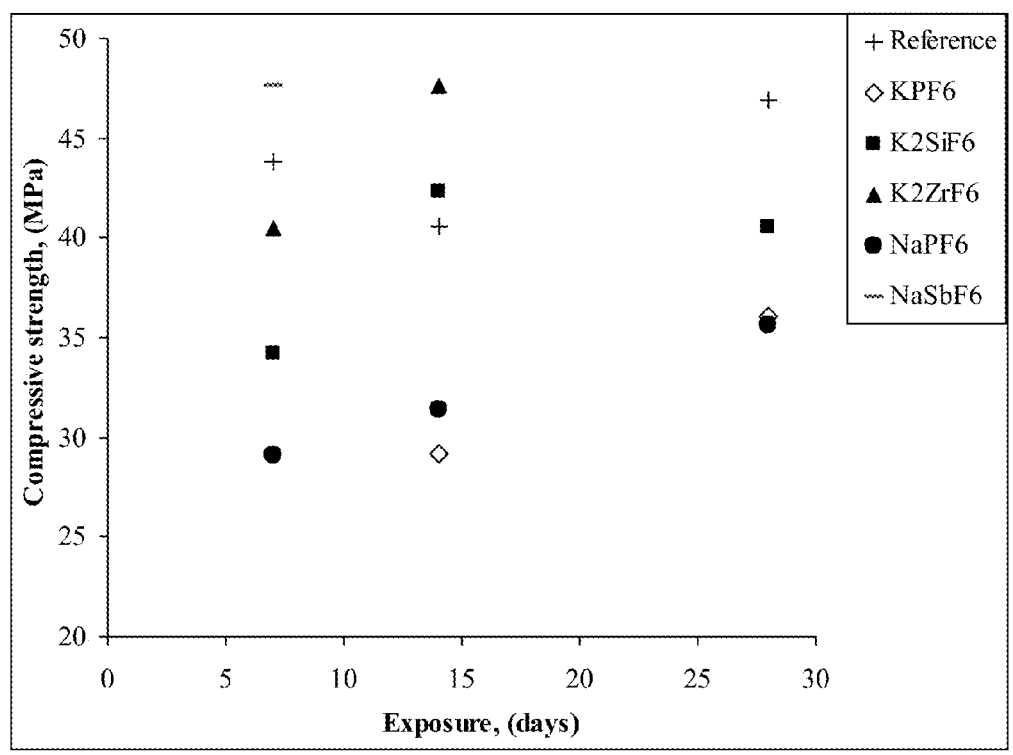

Reference is now made to FIG. 7, showing results of CS measurements of cements (unpolished casts) of varying compositions as a function of time following setting of the cement. In this figure, the properties are being measured on a time scale of tens of days rather than tens of minutes. FIG. 7a shows results for cements to which a retarder (1% $K_2TIF_6$ or $Na_2TiF_6$) has been added; FIG. 7b shows results for cements to which an accelerant (1% $K_3AlF_6$) has been added; and FIG. 7c shows results for cements containing a variety of additional fluorine-containing additives. In all cases, the cement was mixed for 15 min. While there is scatter in the data, it is clear that there are only minor long-term differences between the compressive strength of the cement containing an additive and that of cement to which no additive has been added.

From the results in the figures, we can see that the additives herein disclosed have the desirable properties of being able to alter significantly the hardening time of an MSPC, while, moreover, not affecting to any significant degrees the other physical properties of the hardened cement. The bulk density of each cast was calculated from the measured dimensions and weight, and ranged from 1.88 to 2.04 g/cm$^3$ (=1.95±0.05 g/cm$^3$) and the CS was in the range of 36-51 MPa. Furthermore, results show that all of the $[MF_6]^{n-}$ salts tested fall along a continuum from strong retarder to strong accelerant. We thus conclude that any $[MF_6]^{n-}$ salt (not just the set for which test results are herein reported) will act to alter the hardening rate of an MSPC to which it is added.

The inventors of the present invention have discovered that the additive surprisingly becomes more effective when it is coated onto the particles of MgO rather than added as a separate component of the cement mix. This effect is particularly evident when the additive is a retarder. For example, addition of the same quantity of retarder to the mix in the forme of a coating of the MgO particles provides a longer setting time than addition of the same amount of retarder as a separate component as disclosed in the embodiments of the invention described above.

Without wishing to be bound by theory, it appears that there are several possible explanations for the observed unexpected improvement in the performance of the additive when it is present as a coating rather than as an individual component of a mixture. It is possible that the intimate contact with the MgO particles ensures more thorough and more uniform mixing of the reactants than adding them separately and mixing would; such intimate contact might also lead to formation of greater amounts of $MgTiF_6$ from the reaction of MgO with $H_2TiF_6$ than simple mixing does. When the additive is added as a separate ingredient, it is not possible to guarantee that every encounter between MgO and phosphate will necessarily include an interaction with the additive.

It also possible that the increased effectiveness of the additive when it is present as a coating arises at least in part from physical rather than purely chemical causes. For example, the presence of the additive as a coating may act to prevent direct reaction between MgO and phosphate until the coating has at least partially broken down or eroded, at which point it is automatically in contact with the two reactants. It is also possible that partial coating of the MgO particles by the additive can increase the additive's effectiveness by slowing down the rate at which ions such as $MgOH^+$ are released from the particle.

It was also found that the cement mix of the present invention unexpectedly yields a cement product with improved physical characteristics relative to cements containing an $MF_6^{n-}$ retarder added as a separate component, in particular, an improved workability, which makes it easier to cast.

Additional practical advantages of including the rate-altering additive as a coating rather than as a separate ingredient include the possibility of providing the cement mix in a single container and as a single component. In addition, providing the retarder as a coating to the MgO lessens the tendency of the cement mix to form lumps while it is in its packaging, allowing the use of conventional and more environmentally friendly packaging.

In preferred embodiments of the invention, the retarders disclosed above (acids and salts of the general formula $A_xMF_6$) are used. In preferred embodiments, the retarders are chosen from salts and acids of $TiF_6^{2-}$ and/or $ZrF_6^{2-}$. In the most preferred embodiments, the retarder is selected from $H_2TiF_6$, $Na_2TiF_6$, and $K_2TiF_6$. In preferred embodiments, the retarder is present in a quantity of between about 0.05% and about 5% by weight relative to the weight of dry cement. A typical embodiment contains about 0.5% by weight of additive based on dry weight of the final product.

The cement mix according to some embodiments of the present invention is prepared as follows. First, the MgO is coated with the additive. The coating is performed by preparing a slurry of retardant in water in a tank with stirring. In preferred embodiments, distilled water is used. In the most preferred embodiments, the retardant used is liquid $H_2TiF_6$, which is added to the water. Commercially available solutions of $H_2TiF_6$ in water (generally 50%-60%) may be used. In typical embodiments, the slurry comprises about 1% $TiF_6^{2-}$ by weight; in preferred embodiments, it comprises about 1.2% by weight. The MgO is then added to the tank; in preferred embodiments of the invention, the ratio of $TiF_6^{2-}$ to MgO is about 0.024 by weight. One skilled in the art will readily understand how to optimize the conditions under which the spray-dryer is run. The inventors have found that in the preparation the slurry, the ratio between the weight of retardant and the weight of the MgO is a more significant parameter than the concentration of solids in the slurry for determining the quality of the final dried product. The optimal amount of water in the slurry, as will be appreciated by those skilled in the art, is the minimum volume that will allow easy feeding of the slurry to the dryer, since the use of the minimum amount of water possible will minimize the costs of evaporating the water in the dryer. The inventors have found that the best results were obtained when the slurry comprises less than about 50% solids; higher concentrations tend to lead to solidification of the slurry within the spray-dryer.

The product of the MgO addition (i.e. a slurry of MgO/$TiF_6^{2-}$ in water) is then dried to form particles of coated MgO. In preferred embodiments, a spray dryer is used. In preferred embodiments of the invention, the spray dryer is run under operating conditions such that the air exiting the spray dryer has a temperature of at least 100° C. In the most preferred embodiments, the temperature of the air exiting the spray dryer is about 105° C.

The coated MgO particles thus produced typically have sizes of between 0.1 µm and 100 µm, as measured by laser diffraction.

The coated MgO particles are then mixed with a phosphate acid salt (in preferred embodiments, $KH_2PO_4$ or $NaH_2PO_4$) and the aggregate to form the cement mix, as described above for the Nova-Set mix.

To form the cast, the dry cement mix is mixed with a quantity of water (at least stoichiometric) sufficient to effect hydraulic setting of the cement. In preferred embodiments of the invention, the amount of water added is between about 25% and about 28% w/w relative to the dry cement mix.

Following are a series of detailed descriptions of a set of non-limiting examples of the effects of the additives disclosed on the properties of the cement. The data reported in the tables is identical to that which appears in the graphs displayed as FIGS. 1-7 and described above.

EXAMPLES 1-6

$H_2TiF_6$

Example 1 is a control experiment (no additive) that demonstrates the natural properties of the Nova-Set cement to which no retarder or accelerant has been added. Examples 2-6 are non-limiting examples demonstrating the effects of adding varying amounts of $H_2TiF_6$ to the Nova-Set cement. The results are summarized in Table 1.

Example 1a: 396 g water (25° C.) was added to 1570 g Nova-Set. The cement was mixed until the viscosity became too high for further mixing. No casting was done.

Example 1b: 396 g water (25° C.) was added to 1570 g Nova-Set. The cement was mixed for 15 minutes and cast.

Example 2: 3.3 g of a 60% aqueous solution of $H_2TiF_6$ was added to sufficient water (25° C.) to make a total of 396 g. The resulting solution was added to 1570 g Nova-Set (i.e., the $H_2TiF_6$ content of the cement was 0.1% w/w relative to the final cast weight). The cement was mixed for 15 minutes and then cast.

Example 3: 8.3 g of a 60% aqueous solution of $H_2TiF_6$ was added to sufficient water (25° C.) to make a total of 396 g. The resulting solution was added to 1570 g Nova-Set (i.e., the $H_2TiF_6$ content of the cement was 0.25% w/w relative to the final cast weight). The cement was mixed until the viscosity became too high for further mixing; no casting was done.

Examples 4-6: 9.9 g, 13.2 g, or 33.0 g, respectively, of a 60% aqueous solution of $H_2TiF_6$ was added to sufficient water (25° C.) to make a total of 396 g. The resulting solution was added to 1570 g Nova-Set (i.e., the $H_2TiF_6$ content was 0.3, 0.4, or 1.0%, w/w relative to the final cast weight, respectively). The cement was mixed for 15 minutes and then cast.

TABLE 1

| Ex. | [$H_2TiF_6$], w/w % | Mixing time (min) | Vicat force (lbf) | Time to Vicat force (min) | Time to increase in mixing power (min) | Time to reach 35° C. (min) | Compressive strength (MPa) 7 days | Compressive strength (MPa) 28 days |
|---|---|---|---|---|---|---|---|---|
| 1a | 0 | * | — | — | 20 | 12 | — | — |
| 1b | 0 | 15 | 104 | 34 | — | — | 40 | 45 |
| 2 | 0.1 | 15 | 100 | 44 | — | — | 42 | 49 |
| 3 | 0.25 | * | — | — | 61 | 27 | — | — |
| 4 | 0.3 | 15 | 100 | 49 | — | — | 53 | 58 |
| 5 | 0.4 | 15 | 97 | 83 | — | — | 48 | 63 |
| 6 | 1.0 | 15 | 100 | 156 | — | — | 17 | 24 |

*Mixed until the viscosity of the cement became too high for further mixing

EXAMPLES 7-13

Examples 7-13 present experimental results that are given as non-limiting examples of the advantages of the present invention. In all of these experiments, the cement was mixed until the viscosity became too high for further mixing. From the results of these experiments, it can be seen that the fluoride-containing additives have large effects on such parameters as setting time, while not having any noticeable detrimental effects on the physical properties of the cement, such as its compressive strength.

Example 7: This Example is a control experiment, using a reference cement not containing additive. 1884 g Nova-Set was added to 475.2 g water (25° C.) during the course of 1.5 minutes. The cement was mixed until the viscosity became too high for further mixing.

Example 8-13: 1884 g Nova-Set and 1% (w/w relative to the final set weight) of an additive were introduced into 475.2 g water (25° C.) during the course of 1.5 minutes. The cement was mixed until the viscosity became too high for further mixing.

Table 2 summarizes the results for examples 7-13. For these examples, the best measure of the additive's retarder or accelerant effect is the time derivative of the temperature. Therefore, in addition to the maximum temperature ($T_{max}$) and the time $t_{max}$ to reach that temperature, the ratio $\Delta T/t_{max}$ (where $\Delta T$=the overall temperature change, i.e. $T_{max}-25$) is given as well.

TABLE 2

| Ex. | Additive | $T_{max}$, ° C. | $t_{max}$ to $T_{max}$, min | $\Delta T/t_{max}$, ° C./min | Time to maximum mixing power, min |
|---|---|---|---|---|---|
| 7 | none | 42.0 | 24 | 0.71 | 23 |
| 8a | $Na_2TiF_6$ | 44.0 | 43 | 0.44 | 44 |
| 8b | $K_2TiF_6$ | 43.8 | 45 | 0.42 | 31 |
| 9 | $K_2ZrF_6$ | 40.0 | 23 | 0.65 | 24 |
| 10a | $Na_3AlF_6$ | 40.0 | 22 | 0.68 | 23 |
| 10b | $K_3AlF_6$ | 41.5 | 20 | 0.83 | 21 |
| 11a | $NaPF_6$ | 41.0 | 20 | 0.80 | 20 |
| 11b | $KPF_6$ | 42.2 | 27 | 0.64 | 27 |
| 12 | $K_2SiF_6$ | 41.7 | 22 | 0.76 | 23 |
| 13 | $NaSbF_6$ | 43.0 | 36 | 0.50 | 26 |

EXAMPLES 14-20

In order further to demonstrate the advantages of the present invention and in order to provide further data for determining optimum experimental conditions, a further series of experiments was performed. The results shown graphically in the figures are drawn from this series of experiments. Example 14 is a control experiment (no additive) to illustrate the native properties of the cement. For each of examples 14-20, the cement was prepared by adding 475.2 g of water at 25° C. to 1884 g of Nova-Set (Example 14) or to a mixture of 1884 g of Nova-Set and 23.6 g of additive (i.e., 1% w/w relative to the final cast weight, Examples 15-20). For each composition, the powder mixture and the water were mixed for 15 minutes and cast. The measurements on the casts are summarized in Table 3.

The ratios $\Delta T/t_{max}$ and $\Delta F/t_v$, where $\Delta T$ and $t_{max}$ are defined as above, $\Delta F$=100 lbf is the change in Vicat penetration force, and $t_v$ is the time needed to reach a Vicat penetration force of 100 lbf, are given as well. These ratios provide a useful measure of the extent of the retarder or accelerant effect of a particular additive.

TABLE 3

| Ex. | Additive | $T_{max}$, ° C. | $t_{max}$ to $T_{max}$, min | $t_v$, min | 100/$t_v$ (lbf/min) | Compressive Strength (MPa) 7 days | Compressive Strength (MPa) 28 days |
|---|---|---|---|---|---|---|---|
| 14 | none | 59 | 35 | 31 | 3.2 | 43.8 | 46.9 |
| 15a | $Na_2TiF_6$ | 51 | 55 | 48 | 2.1 | 28.8 | 34.6 |
| 15b | $K_2TiF_6$ | 52 | 50 | 41 | 2.4 | 30.1 | 36.4 |
| 16 | $K_2ZrF_6$ | 61 | 36 | 33 | 3.0 | 40.5 | 51.4 |
| 17a | $Na_3AlF_6$ | 61 | 35 | 32 | 3.1 | 41.0 | 44.7 |
| 17b | $K_3AlF_6$ | 61 | 32 | 28 | 3.6 | 39.8 | 41.8 |
| 18a | $NaPF_6$ | 59 | 40 | 38 | 2.6 | 29.1 | 35.6 |
| 18b | $KPF_6$ | 59 | 45 | 42 | 2.4 | — | 36.1 |

TABLE 3-continued

| Ex. | Additive | $T_{max}$, °C. | $t_{max}$ to $T_{max}$, min | $t_y$, min | $100/t_y$ (lbf/min) | Compressive Strength (MPa) 7 days | 28 days |
|---|---|---|---|---|---|---|---|
| 19 | $K_2SiF_6$ | 61 | 37 | 35 | 2.9 | 34.2 | 40.6 |
| 20 | $NaSbF_6$ | 52 | 40 | 32 | 3.1 | 47.6 | 50.4 |

The results summarized in the tables and shown graphically in the figures clearly show that $[MF_6]^{n-}$ additives have significant effects on the hardening time of MSPC without having detrimental effects on the physical properties of the cement. Based on these results, we conclude that these effects are a general property of $[MF_6]^{n-}$ additives. In particular, similar behavior is expected from other alkali and alkaline earth salts of $TiF_6^{2-}$ and $ZrF_6^{2-}$, and in fact from any salt of an $[MF_6]^{n-}$ anion, where M is any element that can form with fluorine such an anion.

EXAMPLE 21

One non-limiting embodiment of a magnesium silicophosphate cement in which the aggregate phase comprises that incorporates an additive according to the present invention is now described. A cement mix comprising 157 g MgO (10% w/w), 549.5 g $KH_2PO_4$ (35% w/w), and 863 g talc (55% w/w) was prepared. 15.7 g (1% w/w) $K_2TiF_6$ retarder was then added to the mix. 392.5 g water were added, followed by a second addition of 102 g water. The mixture was stirred for 15 minutes, and cast in a polypropylene cylinder (9 cm diameter, 4 cm height). The temperature fell from its initial value of 23.8° C. to 21° C. over the first five minutes, then rose to a peak of 29.2° C. after 159 min, after which it slowly returned to room temperature (27.8° C. after 240 min). Vicat penetration force measurements were made commencing 19 minutes after the cement was cast. After 240 minutes, the Vicat penetration force had risen to 33 lbf. The cement was allowed to sit overnight, by which time, the Vicat penetration force had reached 100 lbf.

EXAMPLE 22

Results are presented here as a non-limiting example of one embodiment of the present invention in which the retarder is provided in the form of a coating on the MgO particles. 2000 grams of the dry Nova-Set cement mix, comprising 0.5% of $H_2TiF_6$ retardant coated on the MgO particles as described above, were mixed with 500 grams of water. The cement was then mixed for several minutes until the temperature rose by 3-5° C. relative to the temperature of the water prior to its addition, as measured by an IR thermometer. The cement was then cast. For comparison, an identical amount the Nova-Set mix was prepared with the same quantity of $H_2TiF_6$ retardant introduced with the water added to the dry mix. A comparison of the properties of the two cements is given in Table 4.

TABLE 4

| Characteristic | Standard | units | retarder provided as separate component | retarder provided as coating on MgO |
|---|---|---|---|---|
| Initial setting time (20° C.) | EN196-3 | min | 24 | 45 |
| Final setting time (20° C.) | EN196-4 | min | 27 | 48 |
| Workability | EN123505 | mm | 165 | ≥255 |
| Lumping | In house method | — | lumps were formed | no lumps were formed |

The results presented in the table clearly demonstrate that providing the retarder as a coating on the MgO particles produces a cement with superior properties to a cement to which the retarder is added as a separate component, even though the amount of retarder added was identical.

What is claimed is:

1. A dry cement mix for preparation of a magnesium silicophosphate cement, the dry cement mix comprising:
   MgO;
   a phosphate salt or acid selected from the group consisting of (a) a phosphate salt or acid of the general formula $M_xH_yPO_4$ (1≤x≤3, y=3−x), where M is selected from the group consisting of H, Li, Na, K, Rb, Cs, $NH_4$, and any combination of the above; (b) any other phosphate salt or acid that will provide a binder product characterized by the empirical chemical formula $MMgPO_4 \cdot 6H_2O$, and (c) any combination of the above;
   an aggregate phase selected from the group containing (a) $CaSiO_3$, (b) $SiO_2$, (c) fly ash, (d) sea sand, and (e) any combination thereof; and,
   a fluorine-containing additive;
   wherein the fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

2. The dry cement mix according to claim 1, wherein the aggregate phase additionally comprises talc.

3. The dry cement mix according to claim 1, wherein the MgO is provided in the form of particles, and the particles of MgO are at least partially coated with the fluorine-containing additive.

4. The dry cement mix according to claim 3, wherein the particle size of the particles of MgO is between 0.1 μm and 100 μm.

5. The dry cement mix according to claim 3, wherein the additive is coated upon the particles of MgO in a thickness of at least 0.5 monolayer.

6. The dry cement mix according to claim 3, wherein the additive is coated upon the particles of MgO in a thickness of at least one monolayer.

7. The dry cement mix according to claim 3, wherein the MgO particles coated with additive are the products of a process of spray drying.

8. The dry cement mix according to claim 3, wherein the MgO particles coated with additive are the products of a process comprising steps of preparing a slurry by adding the additive to water; adding the particles of the MgO to the slurry; feeding the addition product to a spray dryer; and spray-drying the addition product, thereby producing coated particles of MgO.

9. The dry cement mix according to claim 1, wherein M' is selected from the group consisting of (a) Ti (n=2), (b) P (n=1), (c) Zr (n=2), and (d) Sb (n=1), and further wherein the additive acts as a retarder.

10. The dry cement mix according to claim 9, wherein the retarder is present in an amount of between about 0.05% and about 5% by weight.

11. The dry cement mix according to claim 1, wherein M' is selected from the group consisting of (a) Al (n=3) and (b) P (n=1), and further wherein the additive acts as an accelerant.

12. The dry cement mix according to claim 11, wherein the accelerant is present in an amount of between about 0.05% and about 5% by weight.

13. A method for producing a dry cement mix according to claim 3, wherein the method comprises:
preparing a slurry comprising a fluorine-containing additive in water;
adding MgO to the slurry;
feeding the product of the step of adding into a dryer;
drying the product, thereby producing particles of MgO at least partially coated with the additive; and,
mixing the at least partially coated particles of MgO with the phosphate salt or acid and aggregate.

14. The method according to claim 13, wherein the step of drying is selected from the group consisting of spray drying, freeze drying, and drum drying.

15. The method according to claim 13, wherein the step of feeding the product of the step of adding into a dryer comprises a step of feeding the product into a spray dryer.

16. The method according to claim 15, additionally comprising a step of operating the spray dryer under conditions effective to produce droplets of sizes between 0.1 μm and 200 μm.

17. The method according to claim 15, additionally comprising a step of operating the spray dryer under conditions effective to produce particles of sizes between 0.1 μm and 100 μm.

18. The method according to claim 15, wherein the step of spray drying additionally comprises a step of maintaining the temperature of the air exiting the spray dryer above 100° C.

19. The method according to claim 15, wherein the step of spray drying additionally comprises a step of maintaining the temperature of the air exiting the spray dryer at about 105° C.

20. The method according to claim 13, wherein the fluorine-containing additive is selected from the group consisting of $H_2TiF_6$, $Na_2TiF_6$, $K_2TiF_6$, and any combination of the above.

21. The method according to claim 13, wherein the weight ratio between MgO and additive is between 0.2% and 25%.

22. A magnesium silico-phosphate cement (MSPC) comprising:
a dry cement mix according to claim 2; and,
sufficient water to effect hydraulic hardening of the cement.

23. The MSPC according to claim 22, wherein the crystal structure of the binder product is isomorphic with $NH_4MgPO_4.6H_2O$.

24. An MSPC comprising:
a dry cement mix according to claim 3; and,
sufficient water to effect hydraulic hardening of the cement.

25. The MSPC according to claim 24, wherein the crystal structure of the binder product is isomorphic with $NH_4MgPO_4.6H_2O$.

26. A magnesium silico-phosphate cement (MSPC) having a Vicat penetration force as defined by ASTM standard C 403/C 403M-06 of at least 100 lbf, the MSPC comprising:
a dry cement mix comprising:
MgO;
a phosphate salt or acid selected from the group consisting of (a) a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; (b) any other phosphate salt or acid that will provide a binder product characterized by the empirical chemical formula $MMgPO_4.6H_2O$; and (c) any combination of the above;
an aggregate phase selected from the group containing (a) $CaSiO_3$, (b) $SiO_2$, (c) fly ash, (d) sea sand, and (e) any combination thereof; and,
sufficient water to effect hydraulic hardening of the cement, the water containing a fluorine-containing additive, in a form selected from the group consisting of (i) suspension, (ii) solution, (iii) any combination thereof;
wherein the fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

27. The MSPC according to claim 26, wherein the aggregate phase additionally comprises talc.

28. The MSPC according to claim 26, wherein the crystal structure of the binder product is isomorphic with $NH_4MgPO_4.6H_2O$.

29. The MSPC according to claim 26, wherein M' is selected from the group consisting of (a) Ti (n=2), (b) P (n=1), (c) Zr (n=2), and (d) Sb (n=1), and further wherein the additive acts as a retarder.

30. The MSPC according to claim 29, wherein the retarder is present in an amount of between about 0.05% and about 5% by weight based upon the weight of dry cement.

31. The MSPC according to claim 30, wherein M' is selected from the group consisting of (a) Al (n=3) and (b) P (n=1), and further wherein the additive acts as an accelerant.

32. The MSPC according to claim 31, wherein the accelerant is present in an amount of between about 0.05% and about 5% by weight based upon the weight of dry cement.

33. A method for altering the rate of hardening of a magnesium silicophosphate cement (MSPC), comprising:
obtaining a magnesium silico-phosphate cement mix comprising:
MgO;
a phosphate salt or acid selected from the group consisting of (a) a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; (b) any other phosphate salt or acid that will provide a binder product characterized by the empirical chemical formula $MMgPO_4.6H_2O$; and (c) any combination of the above; and,
an aggregate phase selected from the group containing (a) $CaSiO_3$, (b) $SiO_2$, (c) fly ash, (d) sea sand, (e) talc, and (f) any combination thereof;
adding to the cement mix a fluorine-containing additive that alters the rate of hardening of an MSPC; and,
adding sufficient water to the mixture to effect hydraulic setting of the cement;

wherein the fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

34. The method according to claim 33, wherein the binder product is isomorphic with $NH_4MgPO_4.6H_2O$.

35. The method according to claim 33, wherein M' is selected from the group consisting of (a) Ti (n=2), (b) Zr (n=2), (c) P (n=1), and (d) Sb (n=1), and further wherein the additive acts as a retarder.

36. The method according to claim 35, wherein the retarder is selected from the group consisting of (a) $Na_2TiF_6$; (b) $K_2TiF_6$; and (c) any combination of the above.

37. The method according to claim 35, wherein the retarder is present in an amount of between about 0.05% and about 5% by weight based upon the weight of dry cement.

38. The method according to claim 35, wherein M' is selected from the group consisting of (a) Al (n=3) and (b) P (n=1), and further wherein the additive acts as an accelerant.

39. The method according to claim 38, wherein the accelerant is present in an amount of between about 0.05% and about 5% by weight based upon the weight of dry cement.

40. The method according to claim 33, additionally comprising:
    providing the MgO in the form of particles; and,
    coating the particles of MgO at least partially with the fluorine-containing additive.

41. A method for altering the rate of hardening of an MSPC having a Vicat penetration force as defined by ASTM standard C 403/C 403M-06 of at least 100 lbf, comprising:
    obtaining a magnesium silico-phosphate cement mix comprising:
        MgO;
        a phosphate salt or acid selected from the group consisting of (a) a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; (b) any other phosphate salt or acid that will provide a binder product characterized by the empirical chemical formula $MMgPO_4.6H_2O$; and (c) any combination of the above; and,
        an aggregate phase selected from the group containing $CaSiO_3$, $SiO_2$, fly ash, sea sand, talc, and any combination thereof;
    preparing a combination of a fluorine-containing additive and volume of water sufficient to effect hydraulic setting of the cement, the combination in a form selected from the group consisting of (a) a suspension of the fluorine-containing additive in the water, (b) a solution of the fluorine-containing additive in the water, and (c) any combination of the above; and,
    admixing the cement mix and the combination;
    wherein the fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

42. The method according to claim 41, wherein the binder product is isomorphic with $NH_4MgPO_4.6H_2O$.

43. The method according to claim 41, wherein M' is selected from the group consisting of (a) Ti (n=2), (b) Zr (n=2), (c) P (n=1), and (d) Sb (n=1), and further wherein the additive acts as a retarder.

44. The method according to claim 43, wherein the retarder is selected from the group consisting of (a) $Na_2TiF_6$; (b) $K_2TiF_6$; and (c) any combination of the above.

45. The method according to claim 43, wherein the retarder is present in an amount of between about 0.05% and about 5% by weight based upon the weight of dry cement.

46. The method according to claim 43, wherein M' is selected from the group consisting of (a) Al (n=3) and (b) P (n=1), and further wherein the additive acts as an accelerant.

47. The method according to claim 43, wherein the accelerant is present in an amount of between about 0.05% and about 5% by weight based upon the weight of dry cement.

\* \* \* \* \*